US010569258B2

(12) United States Patent
Klemt et al.

(10) Patent No.: US 10,569,258 B2
(45) Date of Patent: Feb. 25, 2020

(54) METHOD FOR PREPARING A CATALYST

(71) Applicant: SHELL OIL COMPANY, Houston, TX (US)

(72) Inventors: Andreas Klemt, Leuna (DE); László Domokos, Amsterdam (NL); Frank Peter Friedel, Leuna (DE); Stefan Boettcher, Leuna (DE); Erwin Roderick Stobbe, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/536,231

(22) PCT Filed: Dec. 21, 2015

(86) PCT No.: PCT/EP2015/080790
§ 371 (c)(1),
(2) Date: Jun. 15, 2017

(87) PCT Pub. No.: WO2016/097407
PCT Pub. Date: Jun. 23, 2016

(65) Prior Publication Data
US 2017/0348677 A1 Dec. 7, 2017

(30) Foreign Application Priority Data
Dec. 19, 2014 (EP) .................................... 14199452

(51) Int. Cl.
B01J 23/75 (2006.01)
B01J 23/889 (2006.01)
(Continued)

(52) U.S. Cl.
CPC ........... *B01J 23/8892* (2013.01); *B01J 23/74* (2013.01); *B01J 23/745* (2013.01); *B01J 23/75* (2013.01);
(Continued)

(58) Field of Classification Search
CPC .... B01J 37/009; B01J 37/0236; B01J 37/035; B01J 37/04; B01J 37/06; B01J 37/088; B01J 23/75; B01J 23/8892
See application file for complete search history.

(56) References Cited

U.S. PATENT DOCUMENTS 4,595,703 A  6/1986 Payne et al.
5,945,459 A  8/1999 Mauldin
(Continued)

FOREIGN PATENT DOCUMENTS

CN  104174400 A  12/2014
EP  0071770 A2  2/1983
(Continued)

OTHER PUBLICATIONS

International Search Report and Written Opinion received for PCT Patent Application No. PCT/EP2015/080790, dated Apr. 1, 2016, 10 pages.

(Continued)

*Primary Examiner* — Cam N. Nguyen

(57) ABSTRACT

The invention relates to a method for preparing a catalyst or catalyst precursor comprising a catalytically active material and a carrier material. The invention relates to a catalyst particle and catalyst precursor thereof obtainable by said method. The catalyst may be used in a process for synthesising hydrocarbons.

15 Claims, 1 Drawing Sheet

(51) Int. Cl.
  *B01J 37/00* (2006.01)
  *B01J 37/02* (2006.01)
  *B01J 37/03* (2006.01)
  *B01J 37/04* (2006.01)
  *B01J 37/06* (2006.01)
  *B01J 37/08* (2006.01)
  *C10G 2/00* (2006.01)
  *B01J 37/16* (2006.01)
  *B01J 23/745* (2006.01)
  *B01J 23/74* (2006.01)
  *B01J 35/02* (2006.01)

(52) U.S. Cl.
  CPC .......... *B01J 35/023* (2013.01); *B01J 37/009* (2013.01); *B01J 37/0072* (2013.01); *B01J 37/0236* (2013.01); *B01J 37/035* (2013.01); *B01J 37/04* (2013.01); *B01J 37/06* (2013.01); *B01J 37/08* (2013.01); *B01J 37/088* (2013.01); *B01J 37/16* (2013.01); *C10G 2/332* (2013.01)

(56) References Cited

U.S. PATENT DOCUMENTS

| | | | | |
|---|---|---|---|---|
| 7,408,086 B2* | 8/2008 | Vanoppen | ............... | B01J 21/063 502/302 |
| 7,427,579 B2* | 9/2008 | Lee | ............... | B01J 23/002 502/232 |
| 7,598,203 B2* | 10/2009 | Kagami | ............... | B01J 23/85 502/242 |
| 7,851,404 B2* | 12/2010 | Lok | ............... | B01J 21/063 502/326 |
| 7,939,699 B2* | 5/2011 | Lok | ............... | B01J 21/063 208/254 H |
| 7,964,526 B2* | 6/2011 | Maesen | ............... | B01J 23/002 502/152 |
| 8,173,570 B2* | 5/2012 | Maesen | ............... | B01J 23/002 502/100 |
| 8,252,709 B2* | 8/2012 | Kato | ............... | B01J 29/076 208/209 |
| 8,575,062 B2* | 11/2013 | Kuperman | ............... | B01J 37/036 502/305 |
| 8,586,500 B2* | 11/2013 | Kuperman | ............... | B01J 37/036 502/305 |
| 8,658,560 B1* | 2/2014 | Han | ............... | B01J 23/60 502/329 |
| 8,703,641 B2* | 4/2014 | Kuperman | ............... | B01J 23/24 502/305 |
| 8,722,563 B2* | 5/2014 | Soled | ............... | B01J 23/888 502/167 |
| 8,722,564 B2* | 5/2014 | Soled | ............... | B01J 23/888 502/167 |
| 8,877,671 B2* | 11/2014 | Radlowski | ............... | B01J 23/882 502/167 |
| 9,381,498 B2* | 7/2016 | Heo | ............... | B01J 23/78 |
| 9,908,110 B2* | 3/2018 | Hyman | ............... | B01J 29/80 |
| 2007/0099797 A1 | 5/2007 | Hu et al. | | |
| 2009/0286678 A1* | 11/2009 | Hagemeyer | ............... | B01J 23/002 502/304 |
| 2009/0298958 A1 | 12/2009 | Clarkson et al. | | |
| 2011/0301024 A1 | 12/2011 | Terorde et al. | | |
| 2012/0046163 A1 | 2/2012 | Ifrah et al. | | |
| 2012/0083540 A1 | 4/2012 | Botha et al. | | |
| 2013/0184361 A1 | 7/2013 | Diehl et al. | | |

FOREIGN PATENT DOCUMENTS

| | | |
|---|---|---|
| EP | 0167215 A2 | 1/1986 |
| EP | 0168894 A2 | 1/1986 |
| EP | 0178008 A1 | 4/1986 |
| EP | 0363537 A1 | 4/1990 |
| EP | 0398420 A2 | 11/1990 |
| EP | 0498976 A1 | 8/1992 |
| JP | 2009520674 A | 5/2009 |
| JP | 2014514153 A | 6/2014 |
| JP | 2014518757 A | 8/2014 |
| RU | 2310508 C2 | 11/2007 |
| WO | 9700231 A1 | 1/1997 |
| WO | 2007068731 A1 | 6/2007 |
| WO | 2012107718 A2 | 8/2012 |
| WO | 2012146950 A1 | 11/2012 |

OTHER PUBLICATIONS

Shi et al. "Studies on Surface Impregnation Combustion Method to Prepare Suppported Co/SiO2 Catalysts and its Application for Fischer-Tropsch Synthesis", Applied Catalysis A: General, vol. 435-436, Jun. 6, 2012, pp. 217-224, XP028425865.

* cited by examiner

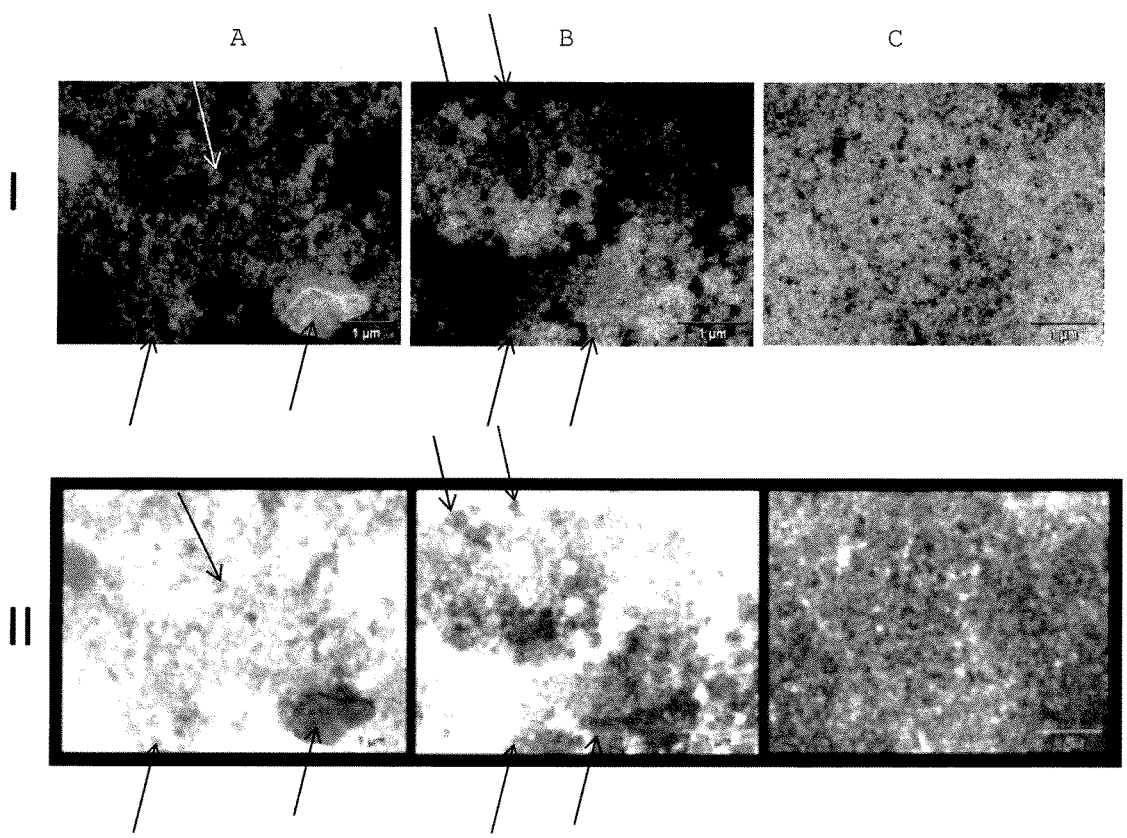

MshUS 10,569,258 B2

METHOD FOR PREPARING A CATALYST

PRIORITY CLAIM

The present application is the National Stage (§ 371) of International Application No. PCT/EP2015/080790, filed Dec. 21, 2015, which claims priority from European Patent Application No. 14199452.2, filed Dec. 19, 2014 incorporated herein by reference.

FIELD OF THE INVENTION

The present invention relates to a method for preparing a hydrogenation catalyst or catalyst precursor thereof comprising a catalytically active material and a carrier material. The present invention relates to a catalyst particle and catalyst precursor thereof obtainable by said method. The present invention relates to a process for preparing hydrocarbons wherein said catalyst is used.

BACKGROUND TO THE INVENTION

The catalytic preparation of hydrocarbons from synthesis gas, i.e. a mixture of carbon monoxide and hydrogen, is well known in the art and is commonly referred to as Fischer-Tropsch synthesis.

Catalysts suitable for use in a Fischer-Tropsch synthesis process typically contain a catalytically active metal of group 8, 9 or 10 of the Periodic Table of the Elements (Handbook of Chemistry and Physics, 89th edition, CRC Press, 2008-2009) supported on a refractory oxide, such as alumina, titania, zirconia, silica or mixtures of such oxides. In particular, iron, nickel, cobalt and ruthenium are well known catalytically active metals for such catalysts. Reference may be made to EP-A-398420, EP-A-178008, EP-A-167215, EP-A-168894, EP-A-363537, EP-A-498976 and EP-A-71770, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703. CN 104 174 400, US 2012/083540, U.S. Pat. No. 5,945,459, US 2011/301024 and LEI SHI ET AL: "Studies on surface impregnation combustion method to prepare supported Co/SiO catalysts and its application for Fischer-Tropsch synthesis", (APPLIED CATALYSIS A: GENERAL, ELSEVIER SCIENCE, AMSTERDAM, NL, vol. 435, 6 Jun. 2012 (2012-06-06), pages 217-224, XP028425865, ISSN: 0926-860X, DOI: 10.1016/J.APCATA.2012.06.007) disclose methods involving impregnation.

Catalysts can be prepared by obtaining a metal hydroxide, carefully oxidising it to the metal oxide and then placing it in the appropriate reactor where it is reduced to the metal in situ.

CN 104 174 400 discloses a method of manufacturing a Fischer-Tropsch catalyst based on impregnating a carrier material.

The first step of the process according to US 2012/083540 entails providing Fe(II) carboxylate in solution. This solution may be formed by means of a dissolution step wherein a source of iron, Fe(0), is dissolved in a suitable solution, preferably an acidic solution, preferably an aqueous solution including one or more carboxylic acids, in order to convert iron in the zero oxidation state to Fe(II) carboxylate in solution where the iron is in an oxidation state of two.

U.S. Pat. No. 5,945,459 discloses a preparation of a catalyst, in which a preformed particulate refractory inorganic solids support is impregnated with a compound, or salt, of a catalytic metal. Similarly, US 2011/301024 discloses a preparation method based on impregnation.

There is a continuous interest in finding catalysts for use in the Fischer-Tropsch synthesis which provide an improved activity and/or an improved selectivity in the conversion of carbon monoxide into valuable hydrocarbons, in particular hydrocarbons containing 5 or more carbon atoms ("C5+ hydrocarbons" hereinafter), and which minimise the formation of methane, which is a hydrocarbon carbon frequently considered as being of lower value.

SUMMARY OF THE INVENTION

A method has been found which provides for an improved hydrocarbon synthesis catalyst and precursor thereof. Said catalysts have a higher C5+ selectivity and activity.

The present invention provides for an improved catalyst.

Accordingly, the present invention provides for a method for preparing a hydrogenation catalyst comprising a catalytically active material and a carrier material, in which method, an acidic solution comprising metal ions of a metal selected from the IUPAC group 8, 9 or 10 metals, preferably cobalt;
a suspension comprising the carrier material; and at least an alkaline solution;
are mixed in accordance to step d.:
d. Mixing the acidic solution, the suspension and the alkaline solution causing the cobalt to precipitate in the presence of the carrier material, obtaining a mixture comprising a precipitate;
wherein at least the acidic solution comprises a carboxylic acid or a conjugated base thereof,
optionally, step d. is preceded by step a., b. and/or c. in which the acidic solution, suspension and alkaline solution are prepared respectively.

The present invention provides for a precursor of a hydrogenation catalyst comprising a metal salt of a group 8, 9 or 10 metal, preferably cobalt(II) on a carrier material wherein the precursor after calcination comprises crystallites of metal oxides having an average crystallite size of maximally 8 nm as measured with XRD.

FIGURES

FIG. 1 shows positives (I) and negatives (II) of scanning electron microscopy pictures of prior art catalysts (A and B) and according to the invention (C).

DETAILED DESCRIPTION OF THE INVENTION

It has been found that with the method according to the present invention a hydrogenation catalyst can be obtained having an increased activity compared to the prior art catalysts. Preferably the catalyst or catalyst precursor obtained with the method and the catalyst precursor according to the present invention, are hydrocarbon synthesis catalysts (or precursor thereof) and more preferably are Fischer-Tropsch catalysts (or a precursor thereof).

The present invention relates to a method in which a catalytic metal component or precursor thereof is precipitated on a carrier material. The inventors have found that the metal precursors are deposited such that a high dispersion is achieved.

The inventors have found that the presence of ammonia, ammonia salts and/or ammonia releasing compounds such as urea have an adverse effect on the properties of the catalyst. Hence in an embodiment of the present invention none of these compounds are present in any of the solutions and suspension. The inventors have found that ammonia and ammonia releasing compounds are not required for a high dispersion of the precipitated metal precursors.

With mixing is meant that two or more solutions are added to a vessel and mixed. Said vessel may contain the suspension and the alkaline and acidic solutions may be added. Adding may be achieved batch wise or in a continuous fashion. Preferably both solutions are added to the suspension at separate positions while stirring the solution.

Alternatively, the method may be conducted in a continuous fashion in which the carrier material containing suspension is admixed together with the acidic and alkaline solution in step d. Preferably the suspension is added such that the level of suspended carrier material remains constant in the mixture of step d., while precipitated material is withdrawn from the mixture.

With obtaining a mixture is meant that during the addition of two or more of the solutions are added to the suspension a mixture is created. The mixture is not only obtained after completion of the addition but also arises at the start of addition. As indicated, the metal(s) will precipitate on the carrier material in ionic form during mixing.

In an embodiment the carboxylic acid or a conjugated base thereof comprises at least one carboxylic acid group. The carboxylic acid or its conjugated base may have a hydroxyl group on the alpha carbon position.

In an embodiment the carboxylic acid or a conjugated base thereof has at least one carboxylic acid group having a pKa value in the range of 3.0-6.5, and in the preferred case with more carboxylic groups at least 2 of the carboxylic acid groups preferably have a pKa values in the range of 4.0-6.5.

In an embodiment the carboxylic acid or a conjugated base thereof is selected from the group consisting of citric acid, malic acid, tartaric acid, gluconic acid or combinations thereof, preferably the acid is citric acid.

In an embodiment the molar ratio of the carboxylic acid or a conjugated base thereof, to the group 8, 9 or 10 metal is maximally 1:5 and preferably at least 1:40, preferably at least 1:20 and more preferably in case the group 8, 9 or 10 metal is cobalt the carboxylic acid or a conjugated base, to cobalt ratio is from 1:15 to 1:10, during mixing. Preferably, carboxylic acid or conjugated base thereof is citric acid (or citrate) and said metal is cobalt and the ratio between these two ingredients is from 1:15 to 1:10.

In an embodiment the pH of the mixture is raised to a pH of at least 5.5 and preferably maintained in the pH range of 5.5 to 10.5 and preferably between 6.5 and 9.

In an embodiment the temperature of the mixture is maintained at a temperature of maximally 95° C. and preferably at least 40° C., preferably in the range of 60-95° C.

In an embodiment the method further comprises a step e. wherein:

e. The precipitate obtained in step d. is separated from the mixture, preferably by means of filtration over a filter press, to obtain a catalyst precursor as a retentate. The catalyst precursor material may be obtained by filter press or the like. The obtained filter cake (retentate) may be dried further if required.

In an embodiment the method comprises a step of:

f. Washing the retentate at least once with a washing medium. Preferably water is used to wash the retentate.

In an embodiment the method comprises a step g. wherein:

g. Drying the retentate obtained in step e. or f.

In an embodiment the alkaline solution is added after the start of mixing of the acidic solution and the suspension, preferably the alkaline solution is added after completion of the mixing of the acidic solution and the suspension.

In an embodiment, step d. is preceded by step a., b. and/or c. In steps a., b. and c. the acidic solution, suspension and alkaline solution are prepared respectively.

In an embodiment the method is conducted batch wise such that first the alkaline solution is added to the suspension until the mixture reaches a pH of 5.5 or higher, continuing the addition of the alkaline solution to the suspension while simultaneously adding the acidic solution and mixing. Preferably the pH is maintained in the pH range of 5.5 to 10.5 and preferably between 6.5 and 9.

In an embodiment the alkaline solution comprises a carbonate containing salt. Preferably, the carbonate containing salt is potassium carbonate, sodium carbonate or a combination thereof. Another base may be present and preferably is selected from the group consisting of sodium hydroxide and potassium hydroxide. The alkaline solution may be added in step d. such that molar ratio of carbonate: IUPAC group 8, 9 or 10 metals, is at least 0.5. The inventors have found that in case cobalt is selected good results are obtained.

In an embodiment of the present invention the carboxylic acid has at least one pKa value in the range of 3.0-6.5 and preferably 4.0-6.5. Good results were obtained with these kinds of additives. In an embodiment of the present invention the additive comprises at least two carboxylic groups and has at least one pKa value in the range of 4.0-6.5, preferably at least 2 pKa values in the range of 4.0-6.5.

In an embodiment of the present invention the additive is selected from one or more members of the group consisting of organic buffers.

In an embodiment of the present invention the additive comprises at least one polyprotic acid.

In an embodiment of the present invention the additive is selected from the group consisting of citric acid, malic acid, tartaric acid or combinations thereof, preferably the additive is citric acid or a citrate salt.

In an embodiment the method according to the present invention further comprises a step of calcining the particles after step d., e., f. or g. The effect of the calcination treatment is to remove (crystal) water, to decompose volatile decomposition products and to convert organic and inorganic compounds to their respective oxides. In an embodiment of the present invention, calcining is performed at maximally 650° C. and preferably maximally 350° C.

According to the prior art (see for example WO2007/068731) calcination is carried out at a temperature generally from 350 to 750° C. The temperatures used in the prior art have an adverse effect on the activity of the catalyst but until now the adverse effects were considered to be less of a disadvantage than the disadvantages of calcining at a lower temperature. The present inventors have found that for the catalyst precursor particles obtained with the method according to the present invention catalysts are obtained with improved selectivity and activity.

The present invention provides for a precursor of a hydrogenation catalyst comprising a metal salt of a group 8, 9 or 10 metal, preferably cobalt(II) on a carrier material wherein the precursor after calcination comprises crystallites of metal oxides having an average crystallite size of maximally 8 nm as measured with XRD. The inventors have found that catalysts having oxidic crystallites of this size or less show good catalytic activity and selectivity upon activation to their metallic state. Further explanation of the XRD are provided in the examples.

In an embodiment of the invention the precursor has a BET value and the metal in its oxidic state contributes to the total BET value of the precursor upon oxidation of maximum 350° C. in an amount of at least 120 m2/gram metal, preferably at least 160 m2/g.

In an embodiment of the invention the precursor comprises a metal salt of a metal selected from the group 8, 9 or 10 metals on a carrier material wherein the relative difference in BET value between the precursor and untreated carrier is at least 20% relative to the BET value of the untreated carrier material, preferably at least 50%. Said precursor may be obtained with the method according to the present invention. The inventors have found that the precursor according to the present invention results in an improved catalyst having good activity and selectivity properties. Especially good results were obtained when cobalt is present as $Co^{2+}$.

In an embodiment the group 8, 9 or 10 metal is cobalt (II) and is present as cobalt hydroxyl carbonate, cobalt hydroxide and/or cobalt hydroxycarbonate and preferably as cobalt hydroxycarbonate.

In an embodiment maximally 6% of the group 8, 9 or 10 metal, preferably cobalt, is present in clusters having an equivalent diameter of 100 nm or larger. Preferably maximally 4% is present in clusters having an equivalent diameter of 100 nm or larger. A cluster is defined as a region in which the cobalt content is at least 125% of the average metal content of the sample.

In an embodiment of the invention the method comprises the steps of drying, calcining and reducing the material obtained in step b. By treating the material in such a way the catalyst precursor is activated.

In an embodiment of the present invention the catalyst particle has a Metal Surface Area (MSA) of at least 7.0 m$^2$ per gram and preferably at least 35.0 per gram of catalyst particle and preferably ranges from 35.0 to 100 m2 per gram of metal in the catalyst.

MSA is an indication of dispersion the metal upon reduction. The MSA for cobalt is determined by $H_2$-chemisorption at 150° C. Prior to chemisorption the catalyst precursor has been calcined at 350° C. and reduced at 350° C., each for a period of maximum 4 hours. The inventors have found that catalyst particles obtained according to the present invention having such an MSA give good results with respect to activity and C5+ selectivity in Fischer-Tropsch synthesis.

For the other group 8, 9 or 10 metals similar methods are known in the art to determine the MSA.

In an embodiment the catalyst particles according to the present invention have an activity of at least 400 gCH2/kg/h and more preferably 500 gCH2/kg/h, the WTY value being weight time yields (WTY), expressed as g (CH2 equivalent hydrocarbons)/kg catalyst/h. In an embodiment the catalyst particles have a C5+ selectivity of at least 90%.

The inventors have found that the distribution of metal particles over the carrier is very good. In pictures obtained with Scanning Electron Microscopy fewer clusters of metal particles are visible. FIGS. 1 A, B and C clearly show the different measures of clustering taking place (for clarity negatives of the pictures are included). The catalyst particles of FIGS. 1 A and B are according to the prior art. The catalyst particles of FIG. 1 C are according to the present invention. FIG. 1 A shows catalyst particles on which the Cobalt particles are not well dispersed and distributed. FIG. 1 B shows catalyst particles on which the Cobalt particles are not well dispersed but distribution is less bad than in FIG. 1 A. The catalyst particles in FIG. 1 C show good dispersion and distribution of the cobalt particles. In FIGS. 1 A and B several locations where cobalt is present are indicated with arrows. Without being bound by any theory the inventors postulate that this distribution results in the improved properties of the catalysts.

A Fischer-Tropsch catalyst or catalyst precursor comprises a catalytically active metal or precursor therefor and optionally promoters, supported on a catalyst carrier. Examples of suitable carrier materials that may be present in the catalyst in addition to titania include: silica, alumina, zirconia, ceria, gallia and mixtures thereof, especially silica and alumina. In an embodiment the carrier material is selected from the group consisting of alumina, preferably alumina in the form of one or more aluminum oxides, silica ($SiO2$), titania ($TiO2$), magnesia ($MgO$), and zinc oxide ($ZnO$), and mixtures thereof.

The catalyst carrier in this case preferably comprises a refractory metal oxide, more preferably alumina, silica, titania, or mixtures thereof, most preferably porous titania. As an example of a suitable carrier material can be mentioned the commercially available Titanium Dioxide P25 ex Evonik Industries. According to an embodiment of the present invention the carrier may comprise titania and another refractory metal oxide or silicate or combinations thereof.

The promotor preferably comprises one or more metals selected from Groups 2-7 and/or 10-12. Preferably a promotor is selected from Groups 2-7 and an activator is selected from Groups 10-12. Promoters can be selected from zirconium, titanium, chromium, vanadium and manganese, especially manganese. A most suitable catalyst or catalyst precursor comprises cobalt as the catalytically active metal and zirconium as a promoter. Another most suitable catalyst or catalyst precursor comprises cobalt as the catalytically active metal and manganese and/or vanadium as a promoter.

The promoter may be precipitated prior to step d. and/or during step d. simultaneously with, or after precipitation of the group 8, 9 or 10 metal. Alternatively, the promotor may be added after having formed the precursor after step d., either before or after shaping the precursor to a catalyst body by methods known in the state of the art, e.g. impregnation or co-mulling.

The present invention relates to a method for preparing hydrocarbons wherein a catalyst according to the present invention is applied. Preferably said hydrocarbons are synthesized in a multi-tubular reactor, a slurry reactor, a micro channel reactor or a plate reactor.

The catalyst obtained with a method according to the present invention is very suitable for use as a Fischer-Tropsch catalyst in case cobalt is selected as the group 8 metal. In an embodiment of the invention the catalyst is used as a Fischer-Tropsch catalyst in a multi tubular reactor.

In case the catalyst according to the present invention is used in a multi tubular reactor it is preferred that the catalyst precursor or catalyst is present in the tubes in catalyst bodies. Accordingly the invention also provides a method of manufacturing a catalyst body comprising: i. mixing a catalyst precursor or a calcined catalyst powder derived from said precursor according to the present invention with a liquid to form a paste; ii. adding said paste to an extruder, the extruder having a die plate comprising one or more dies, each die having a plurality of apertures; iii. extruding the paste through said apertures to form extrudates (the catalyst bodies). These catalyst bodies may be calcined at temperatures up to 650° C. and dried.

Thus the present invention also provides a process for the production of liquid hydrocarbons from synthesis gas, the process comprising: converting synthesis gas in a reactor into liquid hydrocarbons, and optionally solid hydrocarbons and optionally liquefied petroleum gas, at elevated temperatures and pressures; using a catalyst prepared as described herein.

Products of the Fischer-Tropsch synthesis may range from methane to heavy paraffin waxes. Preferably, the production of methane is minimized and a substantial portion of the hydrocarbons produced have a carbon chain length of a least 5 carbon atoms. Preferably, the amount of C5+ hydrocarbons is at least 90% by weight of the total product.

The appended claims form an integral part of the description by way of this reference. The invention is illustrated by the following non-limiting examples.

EXAMPLES

Example 1

First, an alkaline and a metal nitrate solution were prepared. The alkaline solution was obtained by dissolving 30 g NaOH and 40 g Na2CO3 in 830 mL H2O. The metal nitrate solution was prepared by dissolving 198 g of Co(NO3)2.6H2O and 11 g of Mn(NO3)2.4H2O and an amount of citric acid monohydrate corresponding to the molar ratio of citric acid-to-cobalt as mentioned below in 500 ml water. Secondly, 146 g TiO2 (Aeroxide P25 supplied by Evonik) were suspended in 830 ml water and heated under stirring to 95° C. Thus obtained suspension was brought to a pH of 7 by dosing a small amount of the basic solution. After reaching 95° C. both solutions were pumped parallel to the TiO2 suspension at a constant pH of 7 within 25 minutes. The suspension containing the precipitated catalyst precursor was further aged for 1 h at 95° C. before pumping it to a filter press. There the precipitate was filtrated and washed with water. Finally, the wet filter cake was removed from the press and dried under air in a circulated oven and powdered.

Table 1 shows the effect of different citric acid to cobalt molar ratios used for the different catalysts. In addition it shows an example where citric acid was replaced by gluconic acid. Sample A was prepared without a carboxylic acid and is the comparative sample. Sample 4 was prepared according to the procedure above thereby replacing citric acid by gluconic acid and doubling the amount of water to suspend the carrier.

Fixed bed catalyst bodies were prepared as follows. The powdered samples were mixed with demineralized water and several extrusion aids. The extrusion aids act as flow-improving agents, peptising agents and strength improving agents. The amount of extrusion aids added to the mixture was below 3 wt %. The mixtures were kneaded to an extrudable paste. The mixtures were shaped using extrusion to extrudates with a diameter of approximately 2 mm. The extrudates were dried at 80° C. for at least 4 hours and calcined at 350° C. for 1 hour to remove organic materials. The obtained catalysts contained about 20 wt % cobalt and about 1 wt % of manganese.

Prior to the small scale catalytic test activity measurement, the extrudate samples were crushed to particle size below 0.4 mm. The MSA measurements for Example 1 were conducted on the crushed particles.

Catalytic activities can be measured, for example, in a model Fischer-Tropsch reactor. The catalytic activities measured may be expressed as Weight time yield (WTY), whereby the WTY is expressed as the formation of hydrocarbons over the catalyst weight in g hydrocarbons/kg catalyst·hr. Selectivity may be expressed as C5+ selectivity, whereby C5+ represents the weight fraction of hydrocarbons containing 5 or more hydrocarbons in the total amount of hydrocarbons being formed over the catalyst. In table 1 the activity for the samples according to the present invention is expressed relative to the activity of comparative sample A.

Samples prepared according to the invention were reduced with a hydrogen comprising gas at 280° C. for at least 24 hours, and then the activity and selectivity of the samples were determined during a Fischer-Tropsch reaction. The gas feed consisted of a mixture of 25% N2, 50% H2 and 25% CO. The gas was fed at a pressure of 30 bar.

Catalytic activities were measured at a temperature 205°+/−1° C. as a function of time on stream. Prior to testing the catalyst particles were diluted with inert ceramic particles as to enhance the isothermal nature of the small scale testing reactor inventory.

Selectivity was determined as a function of the conversion level by varying the space velocity at isothermal conditions. Selectivity was derived from reactant gas and product gas composition measurements on an online gas chromatograph. Reported C5+ selectivity was determined at equal CO conversion levels. The results are shown in Table 1.

TABLE 1

Results from Example 1

| Sample | Additive | Additive:Co Molar ratio | Co MSA M2/g sample | WTY Relative to sample A | C5+ [%] Relative to sampel A | Runhour range [hr] |
|---|---|---|---|---|---|---|
| A | none |  | 6 | 100% | 0% | 20-25 |
| 1 | Citric Acid | 1:19 | 7 | 135% | +1.0% | 20-25 |
| 2 | Citric Acid | 1:13 | 9 | 174% | +1.3% | 20-25 |
| 3 | Citric Acid | 1:10 | 8 | 161% | +0.7% | 20-25 |
| 4 | Gluconic Acid | 1:13 | 9 | 165% | +1.0% | 20-25 |

The results listed in Table 1 clearly show an increase in activity and in C5+ selectivity for samples 1-4.

Example 2

In order to understand further why samples 1-4 have an increased activity and selectivity the inventors investigated the citric acid to cobalt ratio, the influence of pH, the presence of the additive, varying the additive itself, differing the bases and the temperature during aging. The samples were prepared in accordance with the method of example 1 unless specified otherwise.

The metal surface area (MSA) is determined by H2-chemisorption at 150° C. For the chemisorption the catalyst precursor after their calcination at 350° C. were used contrary to example 1 for which the MSA values were obtained after shaping and crushing. MSA is an indication of the active metal surface area of the catalyst in its activated state.

The crystallite size of the catalyst precursor was determined after its calcination at 350° C. from the line broadening of the Co3O4 reflections according to the Scherrer equation. The inventors have found that catalyst particles obtained according to the present invention (samples 1-3) of example 1 have an MSA of 7.9 or more (see table 2). Accordingly catalysts having such an MSA give good results with respect to activity and C5+ selectivity in Fischer-Tropsch synthesis.

TABLE 2

| Sample ID | Additive during mixing | T (° C.) | Molar ratio Additive:Co | Co MSA M2/g sample | Crystallite Size of Co3O4 by XRD (nm) |
| --- | --- | --- | --- | --- | --- |
| A | None | 95 | 0 | 6.3 | 12 |
| 8 | Citric Acid | 95 | 1:39 | 6.0 | 9 |
| 1 | Citric Acid | 95 | 1:19 | 7.9 | 6 |
| 2 | Citric Acid | 95 | 1:13 | 9.6 | 5 |
| 3 | Citric Acid | 95 | 1:10 | 9.4 | 5 |
| 5 | Citric Acid | 95 | 1:8 | 9.5 | 7 |
| 6 | Citric Acid | 95 | 1:6 | 9.4 | 6 |
| 7 | Citric Acid | 95 | 1:5 | 6.9 | 6 |

Further it was investigated whether the presence of citric acid during mixing or after mixing was essential for obtaining increased MSA values and smaller crystallite sizes. In order to do so preparation of sample 2 was repeated but instead of citric acid being present during the addition of both solutions to the suspension, citric acid was added after completion of the addition of both solutions. The MSA value for this sample was 5.7 and the crystallite size, determined by XRD, 10 nm. Hence the presence of the additive during mixing is at least partly responsible for the higher MSA values and smaller crystallite size.

Table 3 lists the features of catalyst particles using different kinds of additives (citric acid, tartaric acid, malic acid and gluconic acid). Samples 9-11 were prepared using a double amount of water to suspend the carrier prior to mixing, similarly to example 4. Compared to sample A (no additive) elevated MSA levels and smaller crystallite sizes were observed.

TABLE 3

| Sample ID | Additive in precipitation | T ° C. | Molar ratio Additive:Co | Co MSA M2/g sample | Crystallite Size of Co3O4 by XRD (nm) |
| --- | --- | --- | --- | --- | --- |
| A | None | 95 | 0 | 6.3 | 12 |
| 9 | Citric Acid | 95 | 1:13 | 8.5 | 5 |
| 10 | Tartaric Acid | 95 | 1:13 | 7.1 | 7 |
| 11 | Malic Acid | 95 | 1:13 | 8.8 | 8 |
| 4 | Gluconic Acid | 95 | 1:13 | 8.6 | 6 |

Further, the effect of the pH during mixing of the two solutions with the suspension was investigated. In order to do so the mixing was conducted with citric acid as additive at molar additive:Co ratio of 1:13. Mixing was conducted at 95° C. with 1 hr ageing. Samples 12-14 were prepared using a double amount of water to suspend the carrier prior to mixing, similarly to examples 9-11. The results are listed in table 4. The results show that the MSA values and crystallite size vary little over the pH range of 7-10.

TABLE 4

| Sample ID | pH during mixing | Co MSA M2/g sample | Crystallite Size of Co3O4 by XRD (nm) |
| --- | --- | --- | --- |
| A | 7 | 6.3 | 12 |
| 2 | 7 | 9.6 | 5 |
| 12 | 8 | 9.5 | 6 |
| 13 | 9 | 8.7 | 8 |
| 14 | 10 | 9.5 | 6 |

Also the effect of the base on the crystallite size was investigated. In order to establish the effect of the base samples were prepared according to example 2, thereby replacing the mixture of NaOH and Na2CO3 with different bases and base combinations which are listed in table 5. Bases were added in a stoichiometric amount to allow full precipitation of the cobalt and manganese present in the acid solution. Citric acid was used as the additive and the additive to cobalt ratio was 1:13. The results are listed in table 5. Good results were obtained with all bases but especially with CO3 containing bases.

TABLE 5

| Sample ID | Base 1/ molar ratio to metal | Base 2/Molar ratio to metal | T° C. | Crystallite Size of Co3O4 by XRD (nm) |
| --- | --- | --- | --- | --- |
| A | NaOH/1 | Na2CO3/0.5 | 95 | 12 |
| 2 | NaOH/1 | Na2CO3/0.5 | 95 | 5 |
| 15 | NaOH/2 | | 95 | 7 |
| 16 | Na2CO3/1.2 | | 95 | 5 |
| 17 | KOH/2 | | 95 | 7 |
| 18 | K2CO3/1.2 | | 95 | 5 |

Further the effect of the mixing and aging temperature on the completeness of the precipitation of cobalt is investigated. As additive citric acid was used and at molar additive:Co ratio of 1:13. Mixing was conducted for 25 minutes and ageing for 60 minutes. Best results are obtained for mixing and aging at 95° C.

TABLE 6

| Sample ID | Temperature while mixing (° C.) | Temperature while ageing (° C.) | Precipitated fraction of Cobalt |
| --- | --- | --- | --- |
| 2 | 95 | 95 | 100% |
| 19 | 60 | 60 | 97% |
| 20 | 20 | 20 | 93% |
| 21 | 20 | 70 | 97% |

The inventors noted that for all the samples obtained in accordance with the method of present invention an increase in MSA values is observed and a decrease in crystallite size. As shown in Example 1 catalysts with these properties show good results when applied as Fischer-Tropsch catalyst. These catalysts have an increased activity while a good C5+ selectivity is maintained and a slight improvement is observed. The inventors attribute these improved properties to the high dispersion of cobalt on the carrier material. The inventors noted that (as depicted in FIG. 1) the catalysts obtained with the method of the invention cobalt is highly dispersed resulting in smaller cobalt clusters (see FIG. 1C). The prior art catalysts show large clusters (see FIGS. 1A and B). It was determined that the catalyst precursor and catalysts obtained according to the present invention are characterized by a very low fraction of cobalt being present in clusters larger than 100 nm. Such cluster may comprise an agglomerate of small particles or one large conglomerate of cobalt material, and the material can be either amorphous or crystalline of nature. A cluster in our catalyst system is defined as cobalt rich region, i.e. a region where the Co content is at least 25% higher than the average content of the sample. The fraction of cobalt present in such clusters with an equivalent circle diameter of 100 nm is lower than 6% and preferably lower than 4%.

That which is claimed is:

1. A method for preparing a hydrogenation catalyst comprising a catalytically active material and a carrier material, the method comprising,
    a. providing an acidic solution comprising cobalt ions;
    b. providing a suspension comprising the carrier material; and
    c. providing an alkaline solution; and
    d. mixing the acidic solution, the suspension and the alkaline solution causing the cobalt to precipitate in the presence of the carrier material, obtaining a mixture comprising a precipitate;
wherein the acidic solution comprises a carboxylic acid or a conjugated base thereof having a pKa value in the range of 3.0-6.5.

2. The method according to claim 1, wherein the carboxylic acid or a conjugated base thereof comprises at least one carboxylic acid group and the carboxylic acid has a hydroxyl group on the alpha carbon position.

3. The method according to claim 1, wherein the carboxylic acid or a conjugated base thereof has 2 or more carboxylic groups and at least 2 of the carboxylic acid groups have a pKa values in the range of 4.0-6.5.

4. The method according to claim 1, wherein the carboxylic acid or a conjugated base thereof is selected from the group consisting of citric acid, malic acid, tartaric acid, gluconic acid and combinations thereof.

5. The method according to claim 1 wherein, the molar ratio of the carboxylic acid or a conjugated base thereof, to the cobalt is maximally 1:5 during mixing.

6. The method according to claim 1, wherein during step d. the pH of the mixture is raised to a pH of at least 5.5.

7. The method according to claim 1, wherein the temperature of the mixture is maintained at a temperature of maximally 100° C.

8. The method according to claim 1, further comprising a step e. wherein:
    e. the precipitate obtained in step d. is separated from the mixture, by means of filtration over a filter press, to obtain a catalyst precursor as a retentate; and drying the retentate; and comprising a step of:
    f. washing the retentate at least once with a washing medium, preferably water.

9. The method according to claim 1, wherein the alkaline solution is added after the start of mixing of the acidic solution and the suspension, the alkaline solution is added after completion of the mixing of the acidic solution and the suspension.

10. The method according to claim 1, wherein the method is conducted batch wise such that first the alkaline solution is added to the suspension until the mixture reaches a pH of 5.5 or higher, continuing the addition of the alkaline solution to the suspension while simultaneously adding the acidic solution and mixing.

11. The method according to claim 1, wherein the alkaline solution comprises a carbonate containing salt, or a combination of said carbonate salt with another base; wherein the alkaline solution is added in step d. such that molar ratio of CO3: cobalt is at least 0.5.

12. A precursor of a hydrogenation catalyst comprising a metal salt of cobalt, on a carrier material, wherein the precursor after calcination comprises crystallites of cobalt oxides having a crystallite size of maximally 8 nm as measured with XRD, wherein the precursor is prepared according to the method of claim 1.

13. The precursor according to claim 12, wherein the cobalt is present as cobalt hydroxyl carbonate, cobalt hydroxide and/or cobalt hydroxycarbonate.

14. The precursor according to claim 13, wherein maximally 6% of the cobalt is present in clusters having an equivalent diameter of 100 nm or larger and in which a cluster is defined as a region in which the cobalt content is at least 125% of the average metal content of the sample.

15. The precursor according to claim 14, wherein the precursor has a BET value and the metal in its oxidic state contributes to the total BET value of the precursor upon oxidation of maximum 350° C. in an amount of at least 120 $m^2$/gram metal, and/or said precursor has a metal surface area after reduction which is at least 35 $m^2$/gram material.

* * * * *